310-12 SR

FIP8502 OR 4,366,401

United States Patent [19]

Seilly

[11] 4,366,401

[45] Dec. 28, 1982

[54] ELECTROMAGNETIC DEVICES

[75] Inventor: Alec H. Seilly, North Wembley, England

[73] Assignee: Lucas Industries Limited, Birmingham, England

[21] Appl. No.: 197,903

[22] Filed: Oct. 17, 1980

[30] Foreign Application Priority Data

Dec. 1, 1979 [GB] United Kingdom ................. 7941560

[51] Int. Cl.[3] ............................................ H02K 41/00

[52] U.S. Cl. ......................................... 310/12; 310/30

[58] Field of Search ........................ 310/15, 30, 27, 12, 310/14

[56] References Cited

U.S. PATENT DOCUMENTS 4,090,097 5/1978 Seilly .................................... 310/27

4,238,699 12/1980 Seilly .................................... 310/27

4,278,904 7/1981 Seilly .................................... 310/27

*Primary Examiner*—Donovan E. Duggan

[57] ABSTRACT

An electromagnetic device includes a stator having axially spaced pole pieces and windings which when energized cause adjacent pole pieces to have opposite magnetic polarity. An armature surrounds the stator and is of tubular form having a smooth internal surface. The exterior surface of the armature is machined such that at least at one end of the pole pitch distance of the stator the thickness of the armature is such that magnetic saturation of the material forming the armature occurs so that the lines of force between the armature and the pole piece extend in a direction inclined to the axis of the armature thereby resulting in a force acting to cause axial movement of the armature.

4 Claims, 6 Drawing Figures

ELECTROMAGNETIC DEVICES

This invention relates to an electomagnetic device of the kind comprising a stator structure which carries electric windings to which electric current can be supplied, axially spaced pole pieces extending about the stator structure, adjacent ones of said pole pieces assuming opposite magnetic polarity when the windings are supplied with electric current and a tubular armature surrounding the stator structure and which partakes of axial movement when the windings are energised.

In a known form of electromagnetic device of the kind specified as shown in the specification of British Pat. No. 1539514 the internal surface of the armature defines pole pieces complementary to the pole pieces on the stator structure. Prior to energising the windings the pole pieces on the armature and stator structure are axially off-set so that when the windings are energised the armature moves to reduce the reluctance of the magnetic circuits defined by the armature and stator structure including the air gaps between opposing pole pieces. This form of device requires the interior surface of the armature to be machined to define the pole pieces or the armature may be constructed as a complex assembly. The machining operation is made more difficult the smaller the diameter of the armature and the longer the length of the device whilst constructing the armature as an assembly of parts requires precise machining of the individual parts and it also requires that they should be held in engagement with each other.

The object of the present invention is to provide an electromagnetic device of the kind specified in a more convenient form.

According to the invention in a device of the kind specified the internal surface of the armature is smooth and the external surface of the armature is machined so that over the pitch of a pair of adjacent pole pieces of the stator, the armature at least at one end of the pitch distance is of a thickness such that magnetic saturation of the material forming the armature takes place when the windings are energised.

Examples of electromagnetic devices in accordance with the invention will now be described with reference to the accompanying drawings in which.

Figure 1:
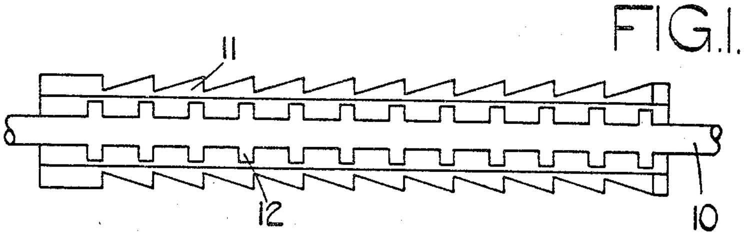
FIG. 1 is a diagrammatic side elevation of the device.

Referring to FIGS. 1-4 of the drawings the device comprises a central stator structure 10 about which is located a tubular armature 11. The stator structure defines a plurality of axially spaced pole pieces 12 which in the arrangement shown are circumferential and which define between them grooves 13. The stator structure is of course formed from magnetisable material and located within the grooves 13 are electrical windings 14.

The windings are elecrically connected together so that the direction of current flow in one winding is opposite to that in the two adjacent windings and as a result adjacent pole pieces 12 will have opposite magnetic polarity. The windings may be connected in series or parallel whichever is the more convenient and in the arrangement shown the connections to the ends of the windings may be taken through longitudinal grooves cut in the pole pieces 12.

The armature 11 is again formed from magnetisable material. It is of tubular form and has a smooth internal surface. The external surface of the armature is however machined and as will be seen from FIGS. 1-4 of the drawings over one pole pitch of the stator, the armature has a wedge section. The thickness of the thinner end of the wedge section is such that the material from which the armature is formed will magnetically saturate when electric current is passed through the windings.

Figure 2:
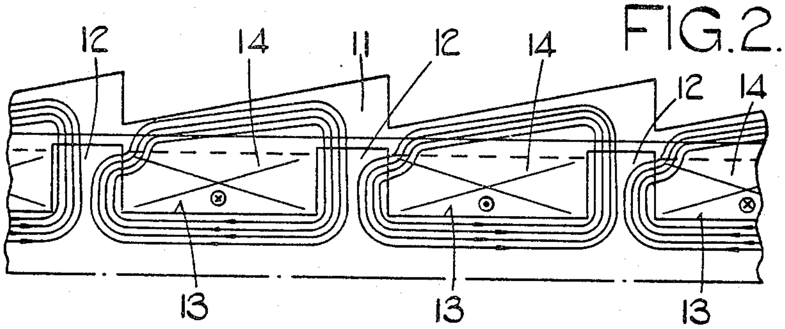
FIGS. 2, 3 and 4 show sections to an enlarged scale of part of the device seen in FIG. 1, and in three axial settings.
Figure 3:
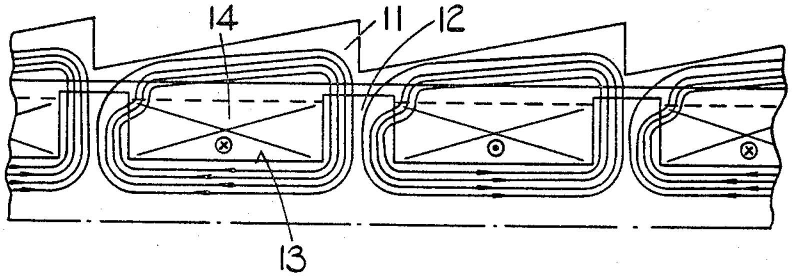
Figure 4:
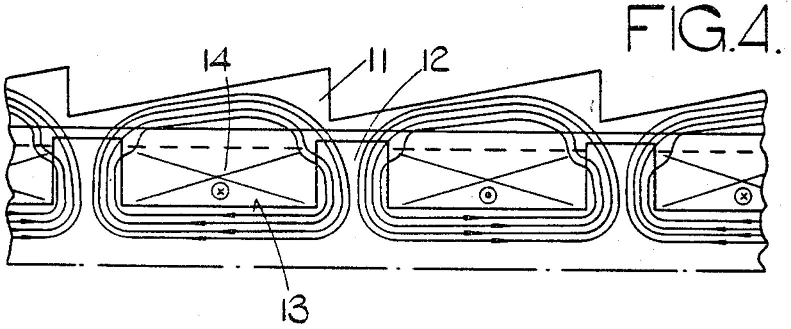

The initial relative position of the armature and stator structure is as shown in FIG. 2 and when the windings are energised magnetic flux attempts to pass between adjacent pole pieces. In order to do this it passes across the air gap between the pole piece 12 and the wider end of the section, along the section and then because of the magnetic saturation which occurs at the narrower end of the section, most of the flux passes through a longer air gap to the next pole piece 12. The flux lines follow a path which is inclined to the axis of the device and therefore a force is developed which tends to cause relative axial movement of the armature and stator structure. Some movement is shown to have taken place in FIG. 3 and it will be seen that some of the magnetic flux is passing between the radial air gap between the armature and the pole piece at the narrower end of the section but there is still some flux flowing across the air gap. The final position of movement is shown in FIG. 4 and this is an equilibrium position because as the armature moves further to the left as seen in the various figures, the flux passing between the pole piece and the wider end of the section is also beginning to follow a path which is inclined to the axis of the device. It will be appreciated that the movement of the armature is against the action of a spring or some other device so that when the electric current ceases to flow to the windings, the armature is restored to its original position.

Figure 5:
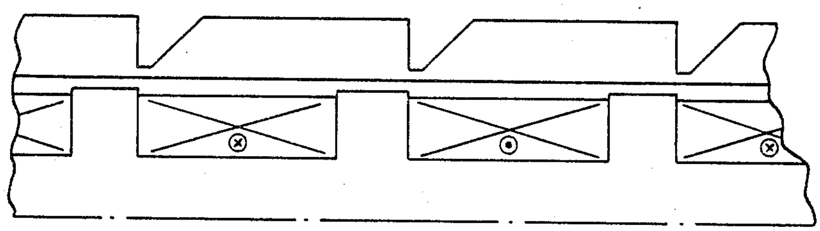
FIGS. 5 and 6 show alternative arrangements.

FIG. 5 shows a modification to the section of the armature and instead of the whole of a section of the armature being of reducing section, only one end portion has a reducing section, the remaining portion being of right cylindical form.

Figure 6:
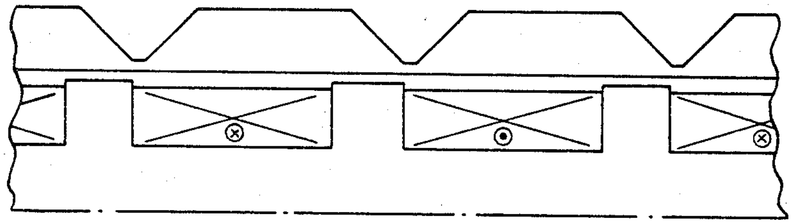

A further modification is seen in FIG. 6 and in this case both end portions of a section as previously defined, of the armature are of reducing cross section.

Whilst the initial starting position has been described above as the position shown in FIG. 2 with the position shown in FIG. 4 as being the final position, it is possible to have as the starting position a relative setting of the stator structure and armature with the armature to the left of the position shown in FIG. 4. In this case the armature will move towards the right when the windings are supplied with current. As with the example described the material at the thinner end of the wedge section will be saturated when the windings are energised.

As described the pole pieces 12 are circumferential however, they may be of helical form to define the equivalent of a two start or a multiple thereof, helical thread. The armature must also be machined in the same manner and in this case it is necessary to prevent relative angular movement between the armature and the stator structure.

It was briefly mentioned above that the armature could act against a spring. The device however may be constructed so that it is double acting and in this case one-half of the length of the armature together with the associated portion of the stator structure, would effect relative movement in one direction and the other half of the armature together with the relevant portion of the stator structure, movement in the opposite direction. In this arrangement it is necesary to divide the windings of the stator structure into two sections one of which is energised to effect movement in one direction and the other of which is energised to effect movement in the opposite direction.

The advantages of this construction over the conventional construction of this type of device are clear. The armature can be formed from a tubular member and its external peripheral surface readily machined. As a result the diameter of the device can be as small as required and its length can be as long as is required.

I claim:

1. An electromagnetic device comprising a stator structure, electric windings on the stator structure to which in use, electric current can be supplied, axially spaced pole pieces extending about the stator structure and having a uniform radial extent outwardly from said stator to define an outer diameter of said stator, adjacent ones of said pole pieces assuming opposite magnetic polarity when the windings are supplied with the electric current and a tubular armature surrounding the stator structure and which partakes of axial movement when the windings are energized, the internal surface of the armature being cylindrical and continuous over essentially the entire length thereof, the diameter of said armature internal surface being slightly larger than said stator outer diameter, and the external surface of the armature having a plurality of steps defined thereon with each step extending for essentially one pitch of said pole pieces, said steps being machined so that over the pitch of a pair of adjacent pole pieces of the stator, at one end of the step distance the armature has a thickness such that magnetic saturation of the material forming the armature takes place when the windings are energized and at the other end of the step the armature is of a thickness such that magnetic saturation of the material forming the armature will not take place when the windings are energized with the varying amount of magnetic saturation creating flux lines along a path which is inclined to the central longitudinal axis of the armature to define an axial force on the armature when the windings are energized.

2. A device according to claim 1 in which the armature has a wedge section over said pitch distance.

3. A device according to claim 1 in which the armature is tapered at said one end of the pitch distance the remaining portion of the armature over said pitch distance being of right cylindrical form.

4. A device according to claim 3 in which the armature at the other end of the pitch distance is of tapering form.

* * * * *